Fig-4

INVENTOR.
MILTON DYKMAN
BY Edward H. Dumpston
HIS ATTORNEY.

INVENTOR.
MILTON DYKMAN
HIS ATTORNEY.

United States Patent Office 2,945,711
Patented July 19, 1960

2,945,711

DRIVING UNIT

Milton Dykman, Rochester, N.Y., assignor to Mixing Equipment Co., Inc., Rochester, N.Y., a corporation of New York Filed Oct. 5, 1956, Ser. No. 614,223

13 Claims. (Cl. 286—11.15)

This invention relates to driving units, and more particularly to those of a speed reduced type for supporting and rotating a driven shaft at reduced speeds, as for example, the drive shaft of an agitating or mixing device, one object of the present invention being to provide an improved unit of the above character having a more practical and efficient construction and mode of operation.

Another object is to provide a unit of the above nature which is so constructed that the driven shaft may be released for movement longitudinally of the unit, for repair or replacement, without substantially effecting the adjustment of the supporting bearings or driving connection.

Another object is to provide a unit of the above character in which there are no bearings directly supporting the driven end of the shaft so that the shaft may be readily moved longitudinally relative to the driving unit without the necessity of first releasing or removing shaft supporting bearings.

Another object is to provide an improved shaft sealing construction having the fluid-tight sealing action of a mechanical seal but which is so constructed that if for any reason the mechanical seal should fail, the damaged seal may be readily replaced with an operable mechanical seal, without, however, necessitating the disassembly of the sealing apparatus, the removal of the shaft and agitator from the receptacle, or the need of highly skilled workmen.

Another object is to provide a shaft sealing construction having the above advantages, which is provided with improved auxiliary sealing means in addition to the mechanical seal so that upon failure of the mechanical seal, the opening through the wall of the mechanical seal around the shaft can be quickly and easily resealed by the auxiliary sealing means, thereby preventing loss of contents and facilitating the replacement of the mechanical seal.

Another object is to provide a shaft sealing construction of the above nature in which the auxiliary sealing means also provides a substantially fluid-tight seal so that the shaft sealing construction may be safely used with pressure receptacles or in positions below the level of the contents between the receptacle.

Another object is to provide a shaft sealing construction of the above character in which the auxiliary sealing means may be brought into sealing engagement, the damaged mechanical seal replaced with an operable mechanical seal, and the replacement mechanical seal moved into sealing position with a minimum of time and effort, and without necessitating removal of the agitator shaft from the receptacle or the disassembly of the agitating apparatus.

Another object is to provide a driving unit having the above advantages which when coupled with a mechanical seal, provides a construction whereby the shaft may be quickly moved when the mechanical seal fails, to bring the auxiliary seal into position to reseal the shaft opening and thereby prevent loss of the receptacle contents during the repair or replacement of the mechanical seal.

A further object is to provide a unit of the above character in which the driven shaft may be of substantially uniform diameter or cross section, thereby requiring a minimum of machining or other special manufacturing operations.

To these and other ends the invention resides in certain improvements and combinations of parts, all as will be hereinafter more fully described, the novel features being pointed out in the claims at the end of the specification.

The preferred embodiment of the present invention is herein disclosed, by way of illustration, as embodied in a unit adapted for driving the impeller or agitator shaft of a mixing device, and particularly the type which is adapted for use with a container having a flanged nozzle through which the agitator shaft extends into the container for mixing or otherwise agitating the container contents. The present invention is an improvement over that disclosed in my copending joint application with Richard D. Boutros, Serial No. 421,732, filed April 8, 1954, now abandoned, the invention disclosed and claimed therein being disclosed and claimed in a continuation application, Serial No. 607,195, now Patent No. 2,911,240.

More specifically, my invention provides a unit for supporting and driving the outer end of a shaft such as the impeller or agitator shaft such as that described above. With mixing devices of the above type, I have found it desirable to provide an auxiliary seal in addition to and inboard of the primary seal whereby the agitating action may be stopped and the opening for the shaft may be temporarily sealed while the primary seal is repaired or replaced. Therefore, while I have shown my driving unit in conjunction with a seal construction utilizing a mechanical seal as the primary seal, it will be understood that my driving unit may be used with other types of known seals. However, in such instances where an auxiliary seal is provided to supplement the primary seal and allow repair or replacement thereof, it is necessary to move the shaft from its first or normal operative position to a second or non-operative position whereby the auxiliary seal is brought into sealing position and the primary seal can then be safely removed for repair or replacement. In most instances, I have found it desirable to move the agitator shaft axially either into or out of the receptacle and my present driving means is particularly adapted for such use, for it is designed to allow the agitator shaft to be quickly and readily moved relative to the receptacle with a minimum of effort.

Figure 1:
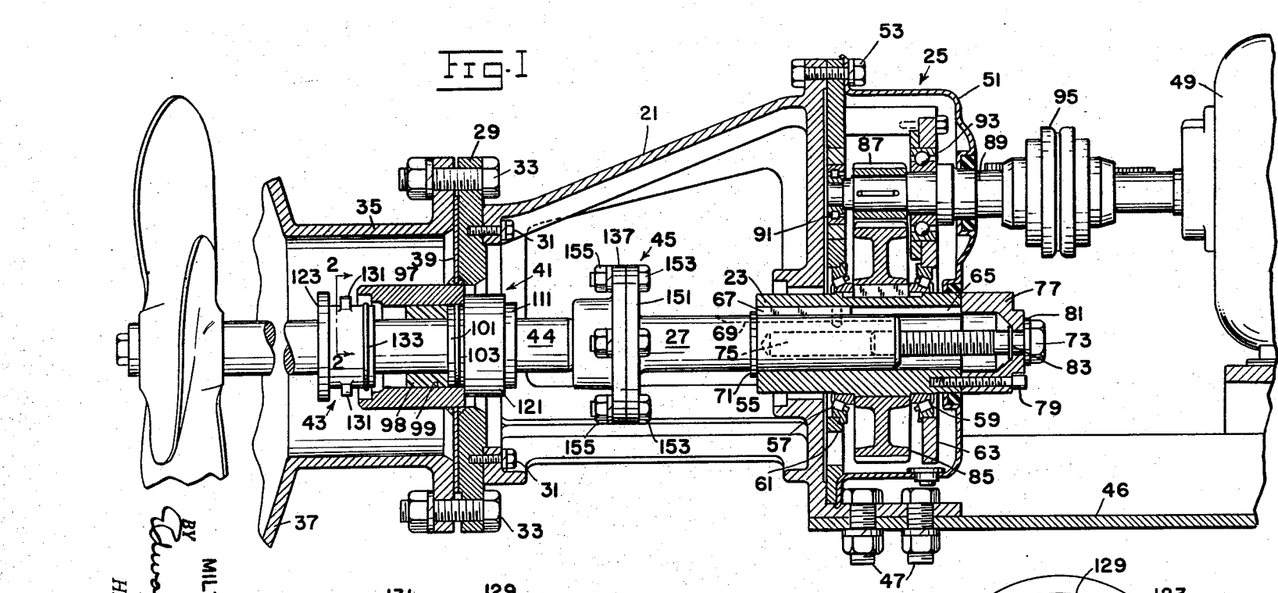
Fig. 1 is a side elevation of a shaft seal construction and a shaft driving unit embodying the present invention and shown as applied to the side of a mixing receptacle.

As shown in Fig. 1 the driving unit preferably comprises an elongated frame member 21, a tubular supporting member 23 which is rotatably supported on frame 21, as hereafter more fully described, speed reducing means shown generally at 25 for rotating said member, and an agitator shaft 27 which is mounted within and supported by member 23. Frame member 21 is attached at its smaller end to a closure or flange member 29 by bolts 31 or other known and suitable means. Closure member 29 is formed with a series of spaced openings or holes through which suitable bolts 33 are passed for connecting it and the driving unit to the flanged nozzle 35 of a fluid containing receptacle or tank, partially shown at 37 by Fig. 1. Member 29 has a sheet of corrosion resistant metal 39 or other suitable material fastened to the inner surface thereof for protecting the plate from the corrosive action of the contents of the receptacle. The opening in member 29 through which the agitator shaft extends is preferably sealed by suitable sealing means which, in the present instance, are shown as comprising a mechanical sealing means shown generally at 41 and an auxiliary seal shown generally at 43, as hereafter more fully described.

When a mechanical seal is used as the primary seal, I prefer to use a sectional shaft having two or more axially aligned sections which are detachably joined by suitable couplings, as hereinafter more fully described. In the present illustration the agitator shaft comprises, in addition to outer section 27, an inner section 44 and a flanged coupling shown generally at 45 (Fig. 1).

Frame member 21 is preferably connected at its outer end to a supporting member or platform 46 by suitable bolts 47. Platform 46 preferably supports an electric motor 49 which drives the mixing device through speed reducing means 25. Speed reducing means 25 are enclosed within a casing 51 which is fastened to the outer end of frame member 21 by suitable bolts 53, as shown in Fig. 1.

Referring now to Fig. 1, it will be seen that the right hand end of frame member 21 is formed with an opening 55 through which shaft supporting member 23 extends. Member 23 is supported by spaced roller bearings 57 and 59. Bearings 57 and 59 are of known and suitable construction and are mounted on stationary supporting members 61 and 63, respectively. Members 61 and 63 are fixed relative to frame member 21 and thus hold bearings 57 and 59 in desired position. Member 23 preferably extends to the right for a short distance beyond the edge of casing 51, as shown in Fig. 1. Member 23 is formed with a longitudinally extending internal keyway 65 for receiving a suitable key 67 which is held on shaft 27 by set screw 68. Key 67 also engages a suitable external keyway 69 formed in shaft member 27 adjacent the outer or right hand end thereof. As a result, any rotary motion imparted to member 23 is transmitted to shaft 27.

However, shaft 27 may be moved axially or longitudinally relative to member 23 while maintaining the above connection between the shaft and member through key 67. Shaft 27 is preferably of uniform diameter and is of such a diameter that it closely fits within member 23 and is supported radially by the member throughout the entire length of the member. As a result, I am able to provide sufficient radial support for the driven end of the agitator shaft without the use of separate shaft bearings so that with my construction it is possible to rapidly move the agitator shaft longitudinally relative to supporting member 23 without the necessity of first loosening shaft supporting bearings. This means that when the primary seal fails, the operator may quickly move the agitator shaft axially or longitudinally to bring the auxiliary seal into temporary sealing position for the repair or replacement of the primary seal, as hereafter more fully explained.

Figure 4:
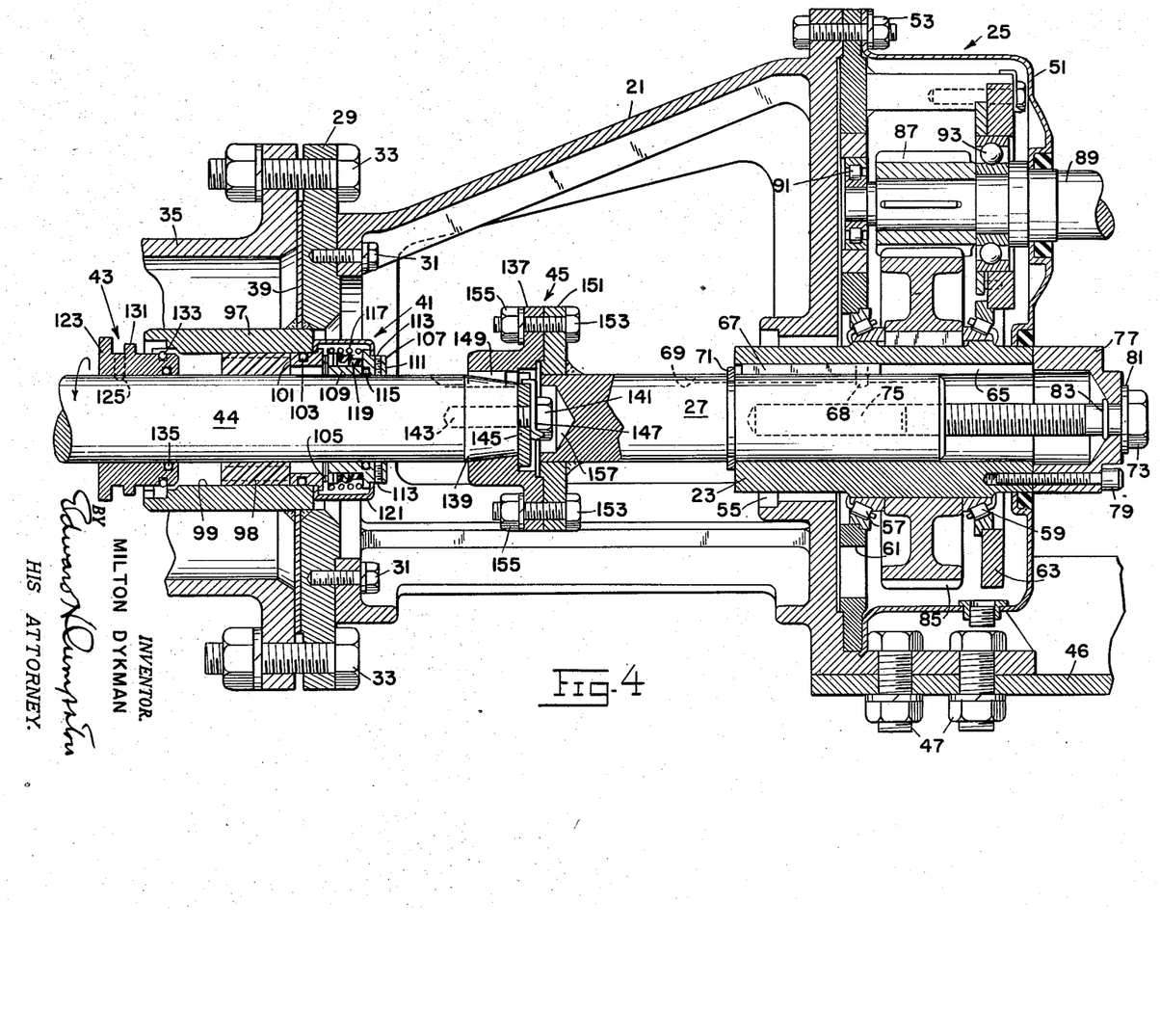
Fig. 4 is similar to Fig. 1, but on a larger scale.

Shaft 27 is prevented from moving axially through member 23 by means of a suitable snap ring 71 (Fig. 4) which engages a circumferentially extending slot in shaft 27 adjacent the inner end of member 23. Ring 71 prevents the shaft from moving outwardly under the axial thrust of the agitating propeller. Shaft 27 is prevented from moving inwardly relative to member 23 by means of a threaded member or bolt 73 which engages an axially bored and tapped hole 75 in the end of shaft 27 and at the same time engages a stationary supporting member 77 which is mounted on the outer end of member 23 by suitable bolts 79. Stationary member 77 is provided with an opening adjacent the center thereof through which bolt 73 extends. Bolt 73 is prevented from moving axially relative to member 77 by means of a washer 81 positioned under the head of the bolt and a snap ring 83 located on the shank of bolt 73 within member 77, as shown in Fig. 4. Although stationary member 77 rotates with member 23, it has no longitudinal movement relative to member 23 and when the driving unit is stopped preparatory to moving the agitator shaft axially, member 77 remains stationary so that rotation of bolt 73 causes the agitator shaft to move axially relative to members 77 and 23. Of course, before the agitator shaft can be moved outwardly, it is necessary to first remove snap ring 71. However, since this is the only operation that need be done before the shaft can be moved, it can be readily seen that when the primary seal fails, the operator can quickly and readily move the agitator shaft axially to the desired position to bring the auxiliary seal into temporary sealing position.

Supporting member 23 preferably has a suitable driving member or gear 85 mounted thereon between bearings 57 and 59. The hub of gear 85 is of sufficient width so that it fits between bearings 57 and 59 and prevents member 23 from being moved longitudinally relative to supporting frame 21. Gear 85 in turn engages a smaller gear 87 which is mounted on a high speed countershaft 89 (Fig. 4). Countershaft 89 is preferably mounted in suitable bearings 91 and 93 which are positioned on opposite sides of gear 87, as shown in Fig. 4. Shaft 89 extends outwardly through casing 51 and is connected to motor 49 through a suitable flexible coupling 95 (Fig. 1) of known construction. Thus, it will be seen that when motor 49 is energized, gear 87 rotates gear 85 and member 23 and the latter in turn drives agitator shaft 27.

Referring now to Fig. 4 and the construction of the shaft seal, it will be seen that closure member 29 has an annular member 97 fastened thereto by welding or other known and suitable means. While I preferably form annular member 97 and closure member 29 separately and then combine them, as above, it will be readily understood that members 97 and 29 may be initially formed as a unitary member. Annular member 97 extends at right angles to plate 29 and has an opening 99 formed therein, through which inner shaft section 44 extends. A bearing 98 is positioned within opening 99 for receiving and supporting shaft section 44, as shown in Fig. 1. Bearing 98 is preferably a bushing made of nylon or other suitable material. Bearing 98 may be omitted in most instances and is necessary only under unusual circumstances, as for example, when inner shaft section 44 is of excessive length. The primary seal is preferably positioned adjacent the outer end of member 97 and in the present instance comprises mechanical seal 41, which is capable of providing a substantially fluid-tight seal. This seal which is of known construction, comprises a stationary sealing ring or member 101 of steel or brass, or other suitable material, which is adapted to closely engage the inner surface of annular member 97, as shown in Fig. 4. Ring 101 is provided adjacent the outer end thereof with an outwardly extending flange for limiting the telescopic movement of the ring within annular member 97. Ring 101 is formed with a circumferentially extending notch or recess which engages and holds an O-ring 103 of natural or synthetic rubber or other suitable material for preventing leakage between ring 101 and member 97. The outer surface of ring 101 is highly finished and forms an effective and substantially fluid-tight seal with a correspondingly highly finished surface of a second sealing ring 105 (Fig. 4) which is preferably of friction reducing, non-corrosive material such as carbon, brass or the like. The inner diameter of ring 101 is somewhat greater than the diameter of shaft section 44 so as to provide clearance therebetween in order that any vibration or flexing of the shaft will not be transmitted to the ring and so that the fluid contents of the receptacle may reach the rings for lubricating and cooling the same.

Whereas ring 101 is stationary and is detachably fixed to closure member 29 through annular member 97, ring 105 is associated with or mounted on shaft 44 for rotation therewith. The means for mounting ring 105 on shaft 44 preferably comprises a floating seat or collar member, shown generally at 107 (Fig. 4) having a cylindrical body portion 109 and a collar portion 111. Member 107 is adapted to be held in adjusted position longitudinally along shaft 44 by a pair of set screws 113 (Fig. 4) and is provided with a notch or groove which receives and holds an O-ring 115 of natural or synthetic rubber, or other suitable and known material, which in conjunction with the close fitting engagement between member 107 and shaft 44 prevents the contents of the receptacle from passing outwardly between said member and shaft.

As shown in Fig. 4, sealing ring 105 is preferably mounted on member 107 by means of a yieldable or resilient connection comprising a coil spring 117. A flexible diaphragm or bellows 119 is provided above ring 105 and between spring 117 and member 107 for sealing ring 105 to member 107 and cushioning the resilient action of spring 117, as well understood in the art. A cylindrical cover or shield 121 having inwardly extending flanges at opposite ends thereof extends under the outer flange portion of stationary ring 101 and extends inwardly over the flanged portion of collar member 107, as shown in Fig. 4. Thus the above mechanism provides an efficient and substantially leak-proof seal, the sealing action taking place between the finished surface of sealing rings 101 and 105 which are resiliently held together in sealing engagement by spring 117. It is to be understood that the composition of O-rings 103 and 115, and flexible diaphragm 119 may be varied to best resist the corrosive action of the particular substance within the receptacle.

However, although sealing rings 101 and 105 afford a substantially leak proof seal capable of years of efficient service, where one of these rings is made, as is commonly the practice, of a frangible material, such as carbon, and such material begins to disintegrate, its disruption is apt to be extremely rapid with little if any warning, unlike the action of a stuffing box and a packed shaft seal. Consequently, when such seals are used where the contents of the receptacle are particularly hazardous or valuable, it is advantageous to provide an auxiliary seal inboard of the primary seal, which may be quickly brought into sealing engagement to temporarily seal the shaft opening and to allow the damaged mechanical seal to be removed and replaced with a new mechanical seal. My present invention is particularly well adapted to provide means for driving and supporting the agitator shaft while at the same time allowing the shaft to be quickly moved axially to bring the auxiliary seal into position, with a minimum of time and effort by the operator.

Figure 2:
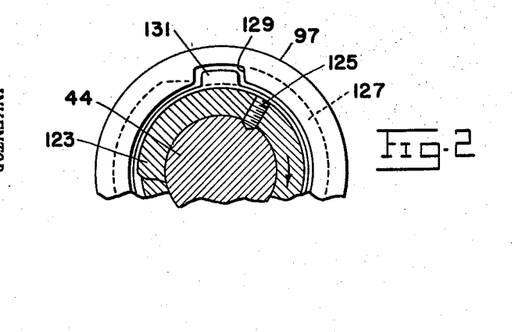
Fig. 2 is an enlarged, fragmentary section substantially along the line 2—2 in Fig. 1.
Figure 3:
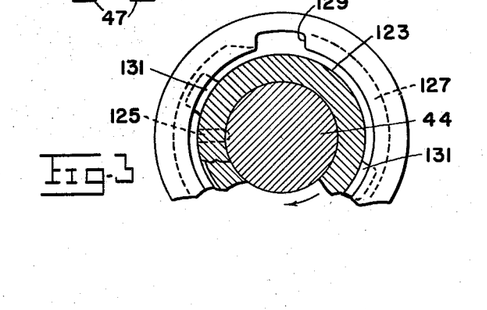
Fig. 3 is an enlarged, fragmentary sectional view substantially along the line 3—3 in Fig. 5 and is similar to Fig. 2, but shows the auxiliary sealing members in sealing position.
Figure 5:
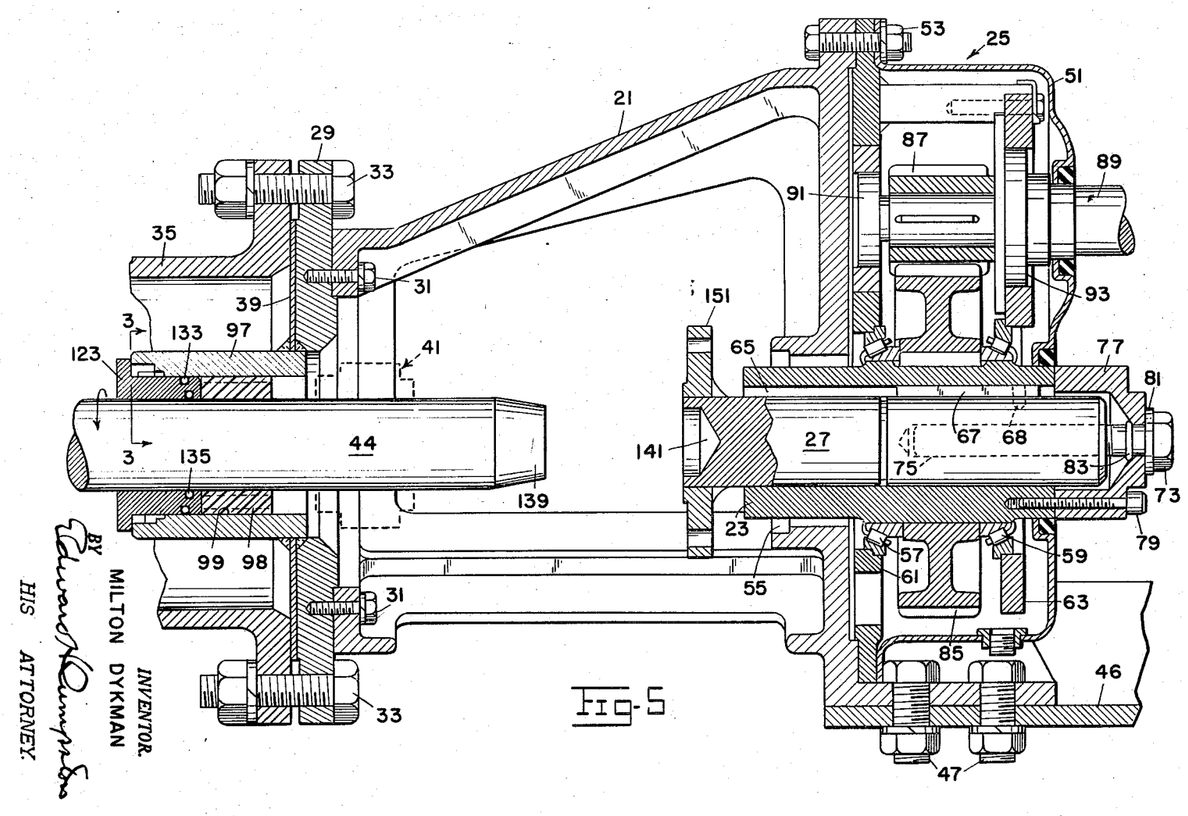
Fig. 5 is similar to Fig. 4, but shows the inner shaft section in inoperative position and the mechanical seal removed for repair or replacement.

The auxiliary sealing means comprises a sealing member 123 (Fig. 4) which is held on inner shaft section 44 by set screws 125 (Fig. 4). The inner end of annular member 97 forms the other auxiliary sealing member and it is preferably formed with an interrupted thread 127 (Figs. 2 and 3) having spaced access openings 129 (Fig. 2). Sealing member 123 is formed with a pair of oppositely extending lugs 131 (Figs. 2 and 3) which, when shaft 44 is moved outwardly from its position shown in Fig. 4, pass through openings 129 into engagement with thread 127. Lugs 131 and thread 127 form the means for holding shaft 44 in its second position, as shown in Figs. 3 and 5. As shaft 44 is rotated in a clockwise direction, as viewed in Fig. 2, lugs 131 move along thread 127, thereby securely holding sealing members 123 and 97 in sealing engagement and holding shaft section 44 in its outboard position. In order to improve the sealing action between members 97 and 123, member 123 is preferably provided with a circumferentially extending groove or recess carrying an O-ring 133 (Fig. 4) of natural or synthetic rubber, or other suitable material. When member 123 is moved into engagement with member 97, ring 133 is interposed between the sealing surfaces of said members and acts as a gasket to improve the sealing action thereof. Member 123 has a second O-ring 135 (Fig. 4) adjacent the inner surface thereof for sealing member 123 to shaft section 44.

In order to bring sealing members 123 and 97 into sealing engagement, locking lugs 131 must be aligned with access openings 129, and to that end, suitable indices are provided on shaft section 44 and the frame of the mixing device. After shaft sections 44 and 27 have been moved through a sufficient distance to bring lugs 131 into engagement with thread 127 (Fig. 2), shaft sections 44 and 27 are then rotated by hand or by special wrench (not shown) in the direction of the arrow in Fig. 2 through a suitable degree of angular rotation, as for example, 120°, thereby moving lugs 131 from their positions shown in Fig. 2 to their locked position shown in Fig. 3. In this position, sealing members 123 and 97 are securely locked in sealing engagement and shaft section 44, to which member 123 is securely attached, is positively held in its outward position by the shaft holding means, lugs 131 and thread 127. During the above axial or longitudinal movement of the shaft sections necessary to bring the auxiliary sealing member into their above sealing position, mechanical seal 41 which is releasably fixed to shaft 44, may be concurrently moved out of engagement with member 97, or if the seal is first loosened from the shaft 44, as by loosening set screws 113, shaft 44 may move through the loosened seal.

In order to facilitate the removal and replacement of mechanical seal 41, flange 137 (Fig. 4) on the outboard end of shaft section 44 is readily demountable from the shaft. To this end, flange 137 is formed with a tapered opening adjacent the center thereof for engaging an oppositely tapered portion 139 adjacent the outboard end of shaft section 44. Flange member 137 is detachably secured to shaft 44 by means of a bolt 141 (Fig. 4) which engages a tapped longitudinally extending opening 143 (Fig. 4) adjacent the outer end of shaft 44. Bolt 141 bears on a washer 145 (Fig. 4) which in turn engages a recessed seat on flange 137 and forces the same downwardly along shaft 44. A locking washer 147 (Fig. 4) is provided for preventing rotation of bolt 141 relative to shaft 44 while the tapered portion 139 of shaft 44 and the tapered internal bore of flange 137 are formed with mating recess portions forming a keyway for the reception of a key 149 (Fig. 4) by means of which flange 137 is prevented from rotating relative to shaft 44. The above tapered fit between flange 137 and shaft 44 assures quick and easy mating of the parts, assures perfect alignment between flange 137 and shaft section 44, and provides a strong, rigid and positive connection between the flange and shaft. Flange 137 is fastened to a flange member 151 (Fig. 4) mounted on shaft section 27. Flange members 137 and 151 are detachably secured together by means of bolts 153 and nuts 155, as shown in Fig. 4, thereby making shaft sections 44 and 27, in effect, a single shaft. Outer shaft section 27 is recessed adjacent the center thereof as at 157 to provide clearance for the head of bolt 141, as shown in Fig. 4.

Thus, it will be readily seen that when mechanical seal 41 fails, the leakage therethrough may be quickly checked by stopping the agitator, aligning the proper indices on inner shaft section 44 and the frame of the mixing device, moving shaft sections 44 and 27 outboard (to the right as viewed in Figs. 1 and 4) by removing snap ring 71 and jacking the shaft sections axially outwardly by means of bolt 73, thereby bringing auxiliary sealing members 97 and 123 into sealing engagement. If it is desired to continue the mixing operation, which is usually the case, all that is necessary to do after sealing members 97 and 123 are brought into their positions shown in Fig. 2, is to rotate shaft sections 44 and 27 and sealing member 123 until lugs 131 are securely locked in threads 127, as shown in Fig. 3. Thereafter, bolts and nuts 153 and 155 are removed allowing outer shaft 27 to be separated from engagement with inner shaft 44. Shaft 27 is then moved further outwardly, as shown in Fig. 5, and flange member 137 is removed from inner shaft section 44 by removing bolt 141. This allows the damaged mechanical seal 41 to be removed from shaft section 44, by sliding the entire mechanical seal, as a unit, over the free end of shaft section 44. Fig. 5 shows shaft sections 44 and 27 separated, flange member 137 removed from shaft section 44 and mechanical seal 41 removed, as above. A new mechanical seal assembly may be slipped into position over the tapered free end of shaft 44 and secured to the shaft in the proper position by set screws 113. Thereafter, flange member 137 is remounted on shaft 44, shaft section 27 is moved into engagement with shaft 44 and flange members 137 and 151 rejoined by bolts 153 and nuts 155. Thereafter, the mixing device may be returned to operative condition by merely unlocking sealing members 97 and 123 and moving shaft sections 27 and 44 inwardly by bolt 73 thereby bringing the new mechanical seal into sealing position while sealing members 97 and 123 are concurrently moved out of sealing interengagement.

It will be understood that although I have shown the mechanical seal 41 as moving outwardly with shaft 44, the seal may be loosened from the shaft by loosening set screws 113, and then the shaft moved axially to its second or outward position through the seal. Thereafter, flange member 137 is removed and the seal is slid upwardly over the free end of shaft section 44, as above.

Figure 6:
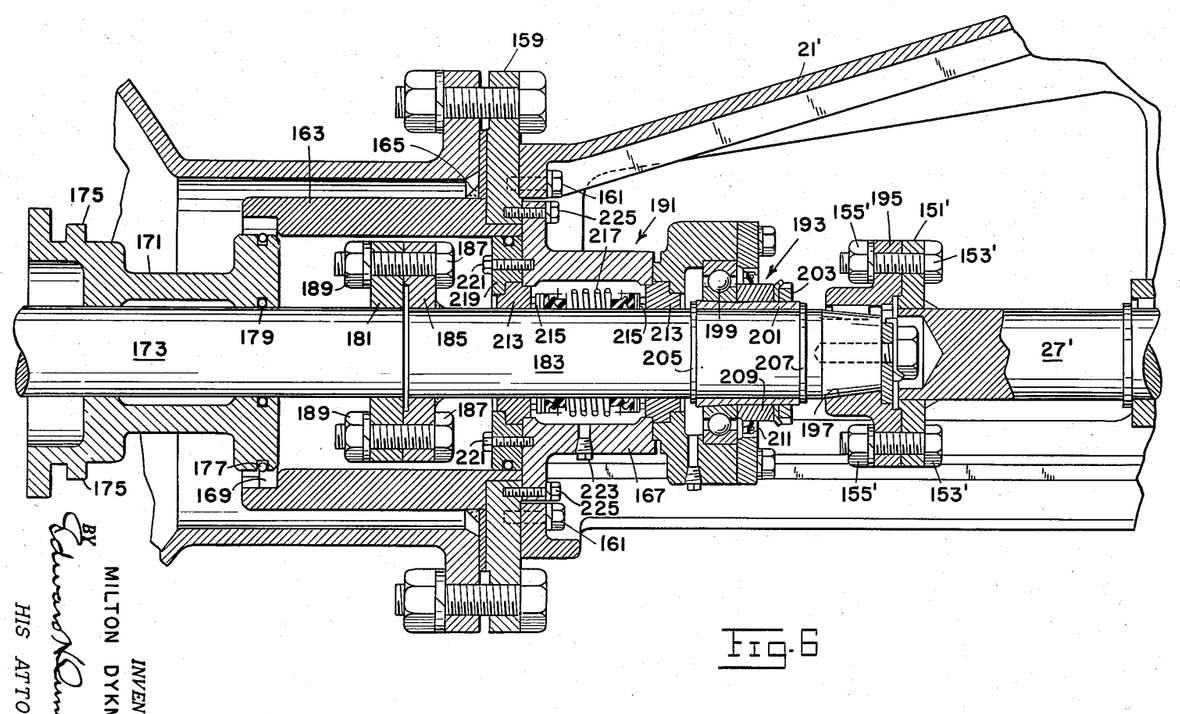
Fig. 6 is a side elevation of a slightly modified construction having a double mechanical seal and shown in position for application to the side of a mixing receptacle.
Figure 7:
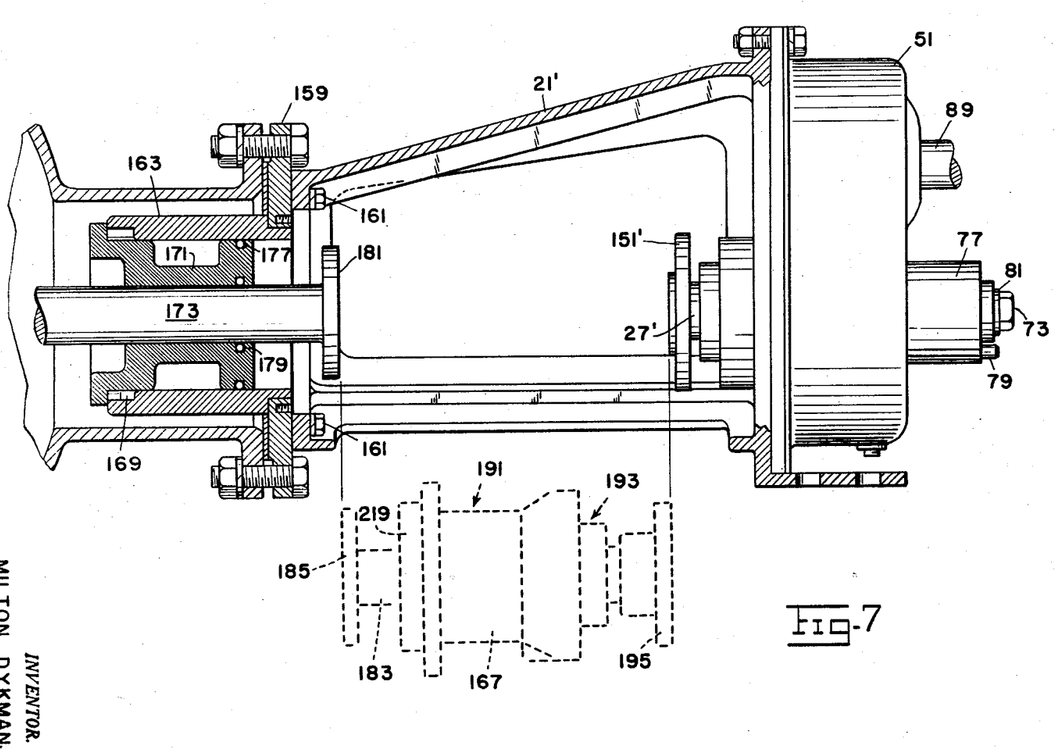
Fig. 7 is similar to Fig. 6, but shows the double mechanical seal moved out of sealing position and the auxiliary sealing members in sealing position.

In Figs. 6 and 7 I have shown a slightly modified shaft seal construction in which the agitator shaft comprises at least three sections. In Fig. 6 the shaft seal is shown as applied to a side entering mixer with only the bottom frame member 21' thereof being shown, the rest being the same as shown in Fig. 1. However, in order to allow proper replacement of the mechanical seal and allow sufficient room for the components thereof, frame member 21' is substantially longer than member 21 shown in Fig. 1. The construction shown in Figs. 6 and 7 is similar to that disclosed above in that combined auxiliary sealing means and shaft holding means are provided inboard of the primary or mechanical seal for temporarily sealing the opening and holding the inner shaft section in position thereby allowing removal and replacement of the mechanical seal. However, in the construction shown in Figs. 6 and 7, a complete section of the agitator shaft, having both the mechanical seal and lower bearing structure in position thereon, is removed as a unit, by means to be presently described.

As shown in Figs. 6 and 7, lower frame member 21' is bolted to a suitable closure member or flange 159 by bolts 161. An annular member 163 is secured as by welding 165 to the tank side of closure member 159 and has a portion thereof extending through an opening formed in member 159 as shown in Fig. 6. The outboard portion of member 163 which projects through the opening in closure member 159 forms a seat for the housing 167 of the mechanical sealing means, as hereinafter described, while the inboard portion of member 163 has an interrupted thread 169, similar to thread 127 formed in member 97 shown in Fig. 2. A second auxiliary sealing member 171 is mounted on inner shaft section 173 by suitable set screws (not shown). Auxiliary sealing member 171 is formed with a pair of oppositely extending lugs 175 for engagement with interrupted thread 169 for holding the inner shaft section in position, when the auxiliary sealing members are brought into sealing engagement, as shown in Fig. 7 and as hereafter described. In order to improve the sealing action member 171 has a circumferentially extending groove adjacent the outboard end thereof, which carries an O-ring 177 of natural or synthetic rubber or other suitable material. O-ring 177 is positioned so as to be located between the oppposite surfaces of sealing members 163 and 171, as shown in Fig. 6, to improve the sealing action thereof. A second O-ring 179 is located on the inside of member 171 to seal the same on shaft section 173 and prevent leakage therebetween.

Shaft section 173 terminates at a distance outboard of sealing member 171 and has a suitable flange member 181 mounted thereon as by welding or other suitable means. An intermediate shaft section 183 connects outer shaft section 27' and inner shaft section 173. Shaft section 183 has a flange member 185 mounted adjacent the inner end thereof as by welding or other suitable means, as shown in Fig. 6. A series of bolts 187 and nuts 189 connect flange members 185 and 181, and thus, shaft sections 183 and 173. Intermediate shaft section 183 extends through housing 167, a double mechanical seal assembly shown generally at 191, and a shaft bearing assembly shown generally at 193, and has secured on the outboard end thereof a demountable flange member 195. Flange 195 has a tapered bore 197 and is mounted on the outboard end of shaft section 183 in the same manner as flange 137 is mounted on the outboard end of shaft section 44 described earlier. Flange 195 is secured to flange 151' mounted on the inner end of shaft section 27' by suitable bolts and nuts such as 153' and 155'.

As stated, intermediate shaft section 183 passes through shaft bearing assembly 193. Bearing assembly 193 comprises a ball bearing race 199 (Fig. 6) which is mounted in a recess in housing 167 and has a tapered internal opening for engagement with the tapered portion of a split sleeve 201 which in turn is held in position on shaft 183 by means of a clamping nut 203 which engages the lower split end of the sleeve. In addition, a pair of snap rings 205 and 207 are located adjacent the inner and outer ends of sleeve 201 for preventing any longitudinal movement of the sleeve along shaft 183. A solid sleeve 209 is positioned between bearing 199 and clamping nut 203 by means of which ball bearing 199 may be moved longitudinally to bring the opposing tapered surfaces of the bearing 193 and sleeve 201 into contact. A dust seal 211 of known and suitable construction is located between bearing 199 and housing member 167.

Housing member 167 forms a continuation and, in effect, a part of closure member 159 and provides a support for the stationary sealing ring, as hereafter described. Members 167 and 159 together reduce the size of the opening in the wall of the receptacle through which the mixer shaft extends to a diameter slightly greater than the diameter of the shaft. The remainder of the opening lies between the shaft and the inner diameter of member 167, and is sealed by the mechanical seal, which as shown generally at 191 (Fig. 6) comprises a double mechanical seal of known construction having a pair of stationary sealing rings 213 and a pair of rotatable sealing rings 215 which are yieldably held in sealing position against rings 213 by a single spring member 217, as shown in Fig. 6 and as well understood in the art. A seal retaining member 219 is held in position on the inboard end of housing member 167 by suitable bolts 221, as shown in Fig. 6. A plug 223 closes the end of a tapped opening through which a suitable lubricating and cooling medium may be introduced.

Thus, it will be seen that when seal housing 167 is released from flange 159 by loosening and removing connecting bolts 225 the entire seal housing 167, bearing assembly 193 and double mechanical seal assembly 191 will move with shaft section 183 axially of the mixing apparatus. This movement of shaft 183 and the above associated parts can be seen by comparing Figs. 6 and 7. Fig. 6 shows the shaft in its first or inboard operative position, the auxiliary members being unsealed and mechanical seal 191 sealing the opening around the agitator shaft. Fig. 7 shows shaft sections 173 and 27' after they have been moved outboard, or to the right as viewed in said figure. Shaft section 183 and associated parts are shown in dotted lines as having been removed from the agitator for repair or replacement. Although the above outward movement of the shaft sections moves housing 167 out of engagement with flange 159 thereby interrupting the sealing action of mechanical seal 191, the same axial movement concurrently brings auxiliary sealing members 163 and 171 into sealing engagement as shown in Fig. 7. After shaft sections 183 and 173 have been rotated to securely interlock the shaft holding means 175 and 169 on the auxiliary sealing members, it is a simple matter to remove shaft section 183 by merely unbolting the connections at the opposite ends thereof. Thereafter, the mechanical seal may be disassembled and repaired or if desired an entire unit comprising intermediate shaft section 183, bearing assembly 193, mechanical seal 191 and associated parts may be substituted for the original parts. I believe this latter procedure to be preferable in that it is much quicker and can be made by any mechanic without the aid of special tools or special knowledge of the critical adjustment of the mechanical seal. In any event, as flange 195 is detachable, both the seal and bearing assemblies may be taken down and the necessary parts replaced. After repairs have been made or a new unit inserted, the necessary connections are made between the opposite ends of shaft section 183 and the inner and outer shaft sections. The shaft sections are rotated to unlock sealing members 163 and 171 and then they are moved axially inboard as by means of bolt 73 to separate the auxiliary sealing member and bring seal housing 167 into position for bolting the same to flange 159, after which the mixing operation may again be resumed.

Thus, it will be seen that my invention provides a novel driving and supporting unit for an agitator shaft. My driving unit provides full radial support for the outer end of the driven shaft without, however, requiring separate bearings for the shaft. The shaft is supported by the driving member or sleeve which closely surrounds the shaft and in turn is mounted in suitable radial bearings. As a result, my construction not only provides adequate support for the driven shaft, but it also allows the operator to quickly and easily move the shaft longitudinally, when, for example, it is desired to bring an auxiliary seal into sealing position. In addition, it will be noted that the driven shaft is of substantially uniform diameter or cross section and thereby requires a minimum of machining operations. Moreover, my construction, as a whole, is simple and practical in character, comprises relatively few parts which are conveniently arranged for ready access, and which may be quickly and economically manufactured and assembled.

It will be seen that my invention provides a novel shaft seal which is particularly well adapted for sealing the opening around a rotatable shaft. The seal construction utilizes the high efficiency of the mechanical seal, while at the same time it provides safety features not heretofore known whereby the mechanical seal may be safely used with dangerous or expensive fluids. As a result of my invention, it is no longer necessary to drain or pump out the receptacle when the mechanical seal fails, but rather, the opening around the shaft may be quickly and positively resealed by merely stopping the mixing apparatus and moving the agitator shaft axially to bring the auxiliary sealing members, located within the receptacle, into sealing engagement. In addition, my invention provides means whereby the damaged mechanical seal may be safely removed and replaced while the shaft opening is sealed by the above auxiliary sealing members. Thereafter, the operative rotation of the shaft may be resumed by merely moving the shaft inboard to its normal operative position, thereby releasing the shaft holding means, separating the auxiliary sealing members and bringing the new mechanical seal into sealing position.

It will be understood that although the various shaft sections shown in the drawings comprise a single length of shaft, my invention is by no means so limited, for any of the inner intermediate or outer shaft sections may in turn comprise one or more lengths of shaft properly connected together. This is particularly true in regard to the inner shaft section when the mixer is used as a top entering mixer, for in such use it may be desirable to construct that portion of the agitator shaft within the receptacle in several segments or sections which are properly coupled together when in position within the receptacle, when the head room above the receptacle is limited.

In addition, while I have shown auxiliary sealing members for resealing the receptacle opening during the repair or replacement of the mechanical seal, my invention is not so limited. When the mechanical seal is above the level of the liquid in the receptacle, as for example, when positioned as a top entering mixer, and the vessel either is not under pressure during the mixing operation, or the pressure may be safely released, it is not necessary to provide an auxiliary seal. However, since the inner end of the inner shaft section is unsupported axially, it is necessary to provide means for holding the inner portion of the shaft in position when the shaft sections are separated for the repair of the mechanical seal. Whether or not the gaskets on the auxiliary sealing means, O-rings 133 and 135 or O-rings 177 and 179 are omitted, I prefer to hold the inner shaft section in non-operative position by the interrupted screw thread means as shown. However, it is readily apparent that when the auxiliary sealing means are omitted, as above, any known suitable means may be used for holding the inner shaft section in non-operative position without departing from the spirit of my invention.

While in the specification and claims I have spoken of the rotatable sealing ring or rings, such as ring 105, as being "on" or "mounted on" the respective shaft section, it is not intended to imply that the rotatable sealing rings are of necessity in direct contact with the respective shaft sections, nor am I limited to such a construction. Indeed, as shown in Fig. 4, and as set forth earlier herein, ring 105 is not in direct contact with shaft section 44, but preferably is mounted on a floating seat or collar 107 which in turn is attached to shaft section 44. The only requirement is that the rotating rings rotate with the respective shaft sections and that they are in fluid-tight relationship therewith. Thus, when I refer to the rotatable sealing rings as being "on" or "mounted on" the respective shaft sections it is understood that I merely mean that the rings are associated with the shaft sections, or more specifically that they rotate, and are in fluid-tight sealing engagement, with said shaft sections. This also applies to the description of the auxiliary sealing members 123 and 171 which are described in the specification and claims as being "on" said shaft section. While I have shown members 123 and 171 as being directly in contact with the respective shaft sections, this is not necessary, and the only requirement is that members 123 and 171 are substantially fixed against axial and radial movement relative to the shaft sections and are in substantially fluid-tight engagement therewith. Thus, when I refer to members 123 and 171 as being "on" a shaft section, I mean merely that they move with respect to the shaft section and are in substantially fluid-tight sealing engagement therewith. It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A sealed shaft construction for use with a fluid containing receptacle having an opening therein, said construction comprising a supporting frame; rotatable shaft means including a plurality of axially aligned sections one of which is adapted to extend through said opening; means for separably connecting adjacent shaft sections; means for radially supporting the driving end of said shaft means comprising a member; bearing means on said frame rotatably supporting said member; said shaft means being slidably supported within said member for axial movement from a first position to a second position and being unsupported axially at the inner end thereof when in said first position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said shaft means; sealing means associated with said shaft means and said closure member for sealing said opening in said closure member; and means for holding said shaft means in said second position thereof, said shaft sections being separable at said connecting means for removal and replacement of said sealing means.

2. A sealed shaft construction for use with a fluid containing receptacle having an opening therein, said construction comprising a supporting frame; rotatable shaft means including a plurality of axially aligned sections one of which is adapted to extend through said opening; means for separably connecting adjacent shaft sections; means for radially supporting the driving end of said shaft means comprising a member; bearing means on said frame rotatably supporting said member; said shaft means being slidably supported within said member for axial movement from a first position to a second position and being unsupported axially at the inner end thereof when in said first position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said shaft means; sealing means associated with said shaft means and said closure member for sealing said opening in said closure member; stationary means adjacent said shaft means; threaded means rotatable in situ, said threaded means engaging said stationary means and said shaft means for moving said shaft means axially relative to said member; and means for holding said shaft means in said second position thereof, said shaft sections being separable at said connecting means for removal and replacement of said sealing means.

3. A sealed shaft construction for use with a fluid containing receptacle having an opening therein, said construction comprising a supporting frame; rotatable shaft means including a plurality of axially aligned sections one of which is adapted to extend through said opening; means for separably connecting adjacent shaft sections; means for radially supporting the driving end of said shaft means comprising a member; bearing means on said frame rotatably supporting said member; said shaft means being slidably supported within said member for axial movement from a first position to a second position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said shaft means; mechanical sealing means for sealing said opening in said closure member, said sealing means comprising a first sealing ring associated with said closure member and having a finished surface, a second sealing ring on one of said shaft sections for rotation therewith and having a finished surface engaging the finished surface of said first ring, means for holding said rings together with said finished surfaces in close fitting, substantially fluid-tight engagement for sealing said opening in said closure member; stationary means adjacent said shaft means; threaded means rotatable in situ, said threaded means engaging said stationary means and said shaft means for moving said shaft means axially; and means for holding said shaft means in said second position thereof, said shaft sections being separable at said connecting means for removal and replacement of said sealing means.

4. A sealed shaft construction for use with a fluid containing receptacle having an opening therein, said construction comprising a supporting frame; rotatable shaft means including a plurality of axially aligned sections one of which is adapted to extend through said opening; means for separably connecting adjacent shaft sections; means for radially supporting the driving end of said shaft means comprising a member; bearing means on said frame rotatably supporting said member; said shaft means being slidably supported within said member for axial movement from a first position to a second position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said shaft means; mechanical sealing means for sealing said opening in said closure member, said sealing means comprising a first sealing ring associated with said closure member and having a finished surface, a second sealing ring on one of said shaft sections for rotation therewith and having a finished surface engaging the finished surface of said first ring, means for holding said rings together with said finished surfaces in close fitting, substantially fluid-tight engagement for sealing said opening in said closure member; stationary means adjacent said shaft means; threaded means rotatable in situ, said threaded means engaging said stationary means and axially engaging the outer end of said shaft means for moving said shaft means axially relative to said stationary means and said member; and means for holding said shaft means in said second position thereof, said shaft sections being separable at said connecting means for removal and replacement of said sealing means.

5. A sealed shaft construction for use with a fluid containing receptacle having an opening therein, said construction comprising a supporting frame; rotatable shaft means having axially aligned inner, intermediate and outer sections one of which is adapted to extend through said opening; means for radially supporting the driving end of said shaft comprising a member; bearing means on said frame rotatably supporting said member; said shaft means being slidably supported within said member for axial movement from a first position to a second position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said one of said shaft sections; mechanical sealing means for sealing said opening in said closure member; said sealing means comprising a first sealing ring associated with said closure member and having a finished surface, a second sealing ring on said one of said shaft sections for rotation therewith and having a finished surface engaging the finished surface of said first ring, means for holding said rings together with said finished surfaces in close fitting substantially fluid-tight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said sealing means; and means for holding said inner shaft section in said second position, said shaft sections being separable at the opposite ends of said intermediate section at said connecting means for removal and replacement of said mechanical sealing means and said intermediate shaft section.

6. A sealed shaft construction for use with a fluid containing receptacle having an opening therein, said construction comprising a supporting frame; rotatable shaft means having axially aligned inner, intermediate and outer sections one of which is adapted to extend through said opening; means for radially supporting the driving end of said shaft comprising a member; bearing means on said frame rotatably supporting said member; said shaft means being slidably supported within said member for axial movement from a first position to a second position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said one of said shaft sections; mechanical sealing means for sealing said opening in said closure member; said sealing means comprising a first sealing ring associated with said closure member and having a finished surface, a second sealing ring on said one of said shaft sections for rotation therewith and having a finished surface engaging the finished surface of said first ring, means for holding said rings together with said finished surfaces in close fitting, substantially fluidtight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said sealing means; stationary means adjacent said shaft means; threaded means rotatable in situ, said threaded means engaging said stationary means and said shaft means for moving said shaft means axially to said shaft second position; and means for holding said inner shaft section in said second position, said shaft sections being separable at the opposite ends of said intermediate section at said connecting means for removal and replacement of said mechanical sealing means and said intermediate shaft section.

7. A sealed shaft construction for use with a fluid containing receptacle having an opening therein, said construction comprising a supporting frame; rotatable shaft means having axially aligned inner, intermediate and outer sections one of which is adapted to extend through said opening; means for radially supporting the driving end of said shaft comprising a member; bearing means on said frame rotatably supporting said member; said shaft means being slidably supported within said member for axial movement from a first position to a second position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said one of said shaft sections; mechanical sealing means for sealing said opening in said closure member; said sealing means comprising a first sealing ring associated with said closure member and having a finished surface, a second sealing ring on said one of said shaft sections for rotation therewith and having a finished surface engaging the finished surface of said first ring, means for holding said rings together with said finished surfaces in close fitting, substantially fluid-tight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said sealing means; stationary means adjacent said shaft means; threaded means rotatable in situ, said threaded means engaging said stationary means and axially engaging the outer end of said shaft means for moving said shaft means axially relative to said stationary means and said member to said shaft second position; and means for holding said inner shaft section in said second position, said shaft sections being separable at the opposite ends of said intermediate section at said connecting means for removal and replacement of said mechanical sealing means and said intermediate shaft section.

8. A sealed shaft construction for use with a fluid containing receptacle having an opening therein, said construction comprising a supporting frame; rotatable shaft means having axially aligned inner, intermediate and outer sections one of which is adapted to extend through said opening; means for radially supporting the driving end of said shaft comprising a member; bearing means on said frame rotatably supporting said member; said shaft means being slidably supported within said member for axial movement from a first position to a second position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said one of said shaft sections; mechanical sealing means for sealing said opening in said closure member; said sealing means comprising a first sealing ring associated with said closure member and having a finished surface, a second sealing ring on said one of said shaft sections for rotation therewith and having a finished surface engaging the finished surface of said first ring, means for holding said rings together with said finished surfaces in close fitting, substantially fluid-tight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said sealing means; bearing means for said intermediate shaft section mounted adjacent said mechanical sealing means; stationary means adjacent said shaft means; threaded means rotatable in situ, said threaded means engaging said stationary means and said shaft means for moving said shaft means axially to said second position; and means for holding said inner shaft section in said second position thereof, said shaft sections being separable at the opposite ends of said intermediate shaft section at said connecting means for removal and replacement of said mechanical sealing means, said bearing means and said intermediate shaft section.

9. A sealed shaft construction for use with a fluid containing receptacle having an opening therein, said construction comprising a supporting frame; rotatable shaft means including a plurality of axially aligned sections one of which is adapted to extend through said opening; means for separably connecting adjacent shaft sections; means for radially supporting the driving end of said shaft means comprising a member; bearing means on said frame rotatably supporting said member; said shaft means being slidably supported within said member for axial movement from a first position to a second position and being unsupported axially at the inner end thereof when in said first position; means for separably connecting adjacent shaft sections; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said shaft means; a first sealing means associated with said shaft means and said closure member for sealing said opening in said closure member; auxiliary sealing members inboard of said first sealing means, one of said auxiliary sealing members being associated with said closure member, the other of said auxiliary sealing members being on said shaft means and movable axially therewith from said shaft first position to said shaft second position to engage said one of said auxiliary sealing members for temporarily sealing said opening in said closure member; and means for holding said shaft means in said second position thereof, said shaft sections being separable at said connecting means for removal and replacement of said mechanical sealing means.

10. A sealed shaft construction for use with a fluid containing receptacle having an opening therein, said construction comprising a supporting frame; rotatable shaft means including a plurality of axially aligned sections one of which is adapted to extend through said opening; means for separably connecting adjacent shaft sections; means for radially supporting the driving end of said shaft means comprising a member; bearing means on said frame rotatably supporting said member; said shaft means being slidably supported within said member for axial movement from a first position to a second position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said shaft means; mechanical sealing means for sealing said opening in said closure member, said sealing means comprising a first sealing ring associated with said closure member and having a finished surface, a second sealing ring on one of said shaft sections for rotation therewith and having a finished surface engaging the finished surface of said first ring, means for holding said rings together with said finished surfaces in close fitting, substantially fluid-tight engagement for sealing said opening in said closure member; auxiliary sealing members inboard of said mechanical sealing means, one of said auxiliary sealing members being associated with said closure member, the other of said auxiliary sealing members being on said shaft means and movable axially therewith; stationary means adjacent said shaft means; threaded means rotatable in situ, said threaded means engaging said stationary means and said shaft means for moving said shaft means axially relative to said member to engage said auxiliary sealing members for temporarily sealing said opening in said closure member; and means for holding said shaft means in said second position thereof, said shaft sections being separable at said connecting means for removal and replacement of said mechanical sealing means.

11. A sealed shaft construction for use with a fluid containing receptacle having an opening therein, said construction comprising a supporting frame; rotatable shaft means having axially aligned inner, intermediate and outer sections one of which is adapted to extend through said opening; means for radially supporting the driving end of said shaft comprising a member; bearing means on said frame rotatably supporting said member; said shaft means being slidably supported within said member for axial movement from a first position to a second position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said one of said shaft sections; mechanical sealing means for sealing said opening in said closure member; said sealing means comprising a first sealing ring associated with said closure member and having a finished surface, a second sealing ring on said one of said shaft sections for rotation therewith and having a finished surface engaging the finished surface of said first ring, means for holding said rings together with said finished surfaces in close fitting, substantially fluid-tight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said sealing means; auxiliary sealing members inboard of said mechanical sealing means, one of said sealing members being associated with said closure member, the other of said auxiliary sealing members being on said inner shaft section and movable axially therewith from said shaft first to said shaft second position to engage said one of said auxiliary sealing members for temporarily sealing said opening in said closure member; means for holding said auxiliary sealing members in sealing engagement and said inner shaft section in said second position thereof, said shaft means being separable at said connecting means for removal and replacement of said mechanical sealing means and said intermediate shaft section.

12. A sealed shaft construction for use with a fluid containing receptacle having an opening therein, said construction comprising a supporting frame; rotatable shaft means having axially aligned inner, intermediate and outer sections one of which is adapted to extend through said opening; means for radially supporting the driving end of said shaft comprising a member; bearing means on said frame rotatably supporting said member; said shaft means being slidably supported within said member for axial movement from a first position to a second position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said one of said shaft sections; mechanical sealing means for sealing said opening in said closure member; said sealing means comprising a first sealing ring associated with said closure member and having a finished surface, a second sealing ring on said one of said shaft sections for rotation therewith and having a finished surface engaging the finished surface of said first ring, means for holding said rings together with said finished surfaces in close fitting, substantially fluid-tight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said sealing means; auxiliary sealing members inboard of said mechanical sealing means, one of said sealing members being associated with said closure member, the other of said auxiliary sealing members being on said inner shaft section and movable axially therewith; stationary means adjacent said shaft means; threaded means rotatable in situ, said threaded means engaging said stationary means and axially engaging the outer end of said shaft means for moving said shaft means axially to said second position to engage said auxiliary sealing members for temporarily sealing said opening in said closure member; means for holding said inner shaft section in said second position thereof, said shaft means being separable at the opposite ends of said intermediate section at said connecting means for removal and replacement of said mechanical sealing means and said intermediate shaft section.

13. A sealed shaft construction for use with a fluid containing receptacle having an opening therein, said construction comprising a supporting frame; rotatable shaft means having axially aligned inner, intermediate and outer sections one of which is adapted to extend through said opening; means for radially supporting the driving end of said shaft comprising a member; bearing means on said frame rotatably supporting said member; said shaft means being slidably supported within said member for axial movement from a first position to a second position; means preventing axial movement of said member relative to said frame; means connecting said shaft means and said member for transmitting rotary movement of said member to said shaft means while allowing axial movement of said shaft means relative to said member; a closure member attachable to a receptacle adjacent the opening therein and having an opening therethrough for the reception of said one of said shaft sections; mechanical sealing means for sealing said opening in said closure member; said sealing means comprising a first sealing ring associated with said closure member and having a finished surface, a second sealing ring on said one of said shaft sections for rotation therewith and having a finished surface engaging the finished surface of said first ring, means for holding said rings together with said finished surfaces in close fitting, substantially fluid-tight engagement for sealing said opening in said closure member; said inner shaft section being inboard of said mechanical sealing means, said one of said shaft sections being an intermediate shaft section and having separable means at the opposite ends thereof for connecting the same to said inner shaft section and to a shaft section located outboard of said sealing means; bearing means for said intermediate shaft section mounted adjacent said mechanical sealing means; auxiliary sealing members inboard of said mechanical sealing means, one of said auxiliary sealing members being associated with said closure member, the other of said auxiliary sealing members being on said inner shaft section and movable axially therewith; stationary means adjacent said shaft means; threaded means rotatable in situ, said threaded means engaging said stationary means and said shaft means for moving said shaft means axially from said shaft first position to said shaft second position to engage said auxiliary sealing members for temporarily sealing said opening in said closure member; and means for holding said auxiliary sealing members in sealing engagement and said inner shaft section in said second position thereof, said shaft sections being separable at the opposite ends of said intermediate shaft section at said connecting means for removal and replacement of said mechanical sealing means, said bearing means and said intermediate shaft section.

References Cited in the file of this patent

UNITED STATES PATENTS

| | | |
|---|---|---|
| 2,234,824 | Kingston | Mar. 11, 1941 |
| 2,424,681 | Eberhart | July 29, 1947 |
| 2,612,391 | Boutros | Sept. 30, 1952 |